(12) United States Patent
Nguyen Hoang et al.

(10) Patent No.: US 8,534,914 B2
(45) Date of Patent: Sep. 17, 2013

(54) SYSTEM AND METHOD FOR ESTIMATING THE JUNCTION TEMPERATURE OF A LIGHT EMITTING DIODE

(75) Inventors: Viet Nguyen Hoang, Leuven (BE); Radu Surdeanu, Roosbeek (BE); Pascal Bancken, Opwijk (BE); Benoit Bataillou, Brussels (BE); David Van Steenwinckel, Holsbeek (BE)

(73) Assignee: NXP B.V., Eindhoven (NL)

( * ) Notice: Subject to any disclaimer, the term of this patent is extended or adjusted under 35 U.S.C. 154(b) by 566 days.

(21) Appl. No.: 12/863,744

(22) PCT Filed: Jan. 27, 2009

(86) PCT No.: PCT/IB2009/050325
§ 371 (c)(1),
(2), (4) Date: Aug. 16, 2010

(87) PCT Pub. No.: WO2009/095853
PCT Pub. Date: Aug. 6, 2009

(65) Prior Publication Data
US 2011/0031903 A1    Feb. 10, 2011

(30) Foreign Application Priority Data

Jan. 28, 2008   (EP) .................................... 08101015
Mar. 4, 2008    (EP) .................................... 08102270

(51) Int. Cl.
*H05B 33/08* (2006.01)
*H05B 37/02* (2006.01)
*G01K 7/01* (2006.01)

(52) U.S. Cl.
USPC ............................ 374/178; 315/307; 702/130

(58) Field of Classification Search
USPC ............ 374/163, 178; 315/309; 324/762.07; 702/136
See application file for complete search history.

(56) References Cited

U.S. PATENT DOCUMENTS

| 7,066,628 B2* | 6/2006 | Allen ........................... 362/267 |
| 7,518,319 B2 | 4/2009 | Konno et al. |
| 8,278,831 B2* | 10/2012 | Hoogzaad et al. ........ 315/209 R |
| 2003/0133491 A1* | 7/2003 | Shih ............................. 374/163 |

(Continued)

FOREIGN PATENT DOCUMENTS

| CN | 101236110 A | 8/2008 |
| GB | 2224374 A | 5/1990 |

(Continued)

OTHER PUBLICATIONS

Siegal, B. Ed—Anonymous; "Practical Considerations in High Power LED Junction Temperature Measurements"; Electronics Manufacturing and Technology, 31st Intl Conference on; IEEE, Piscataway, NJ, US; pp. 62-66 (Nov. 8, 2007).

(Continued)

*Primary Examiner* — R. A. Smith

(57) ABSTRACT

A method of estimating the junction temperature of a light emitting diode comprises driving a forward bias current through the diode, the current comprising a square wave which toggles between high and low current values ($I_{high}$, $I_{low}$), the high current value ($I_{high}$) comprising an LED operation current, and the low current value ($I_{LOW}$) comprising a non-zero measurement current. The forward bias voltage drop (Vf) is sampled and the forward bias voltage drop ($Vf_{low}$) is determined at the measurement current ($I_{LOW}$)—The temperature is derived from the determined forward bias voltage drop.

14 Claims, 4 Drawing Sheets

(56) References Cited

U.S. PATENT DOCUMENTS

| | | | |
|---|---|---|---|
| 2005/0062481 A1 | 3/2005 | Vaugh et al. | |
| 2005/0082553 A1 | 4/2005 | Yamamoto et al. | |
| 2007/0040512 A1 | 2/2007 | Jungwirth et al. | |
| 2007/0103095 A1 | 5/2007 | Yang | |
| 2007/0210722 A1* | 9/2007 | Konno et al. | 315/185 S |
| 2008/0231198 A1* | 9/2008 | Zarr | 315/119 |
| 2011/0243167 A1* | 10/2011 | Castillo et al. | 372/34 |
| 2012/0299481 A1* | 11/2012 | Stevens | 315/117 |

FOREIGN PATENT DOCUMENTS

| | | |
|---|---|---|
| JP | 60030186 A * | 2/1985 |
| WO | 00/18290 A1 | 4/2000 |
| WO | 2006043232 A1 | 4/2006 |
| WO | 2007019663 A1 | 2/2007 |
| WO | 2007069149 A1 | 6/2007 |
| WO | 2009/000475 A2 | 12/2008 |

OTHER PUBLICATIONS

Hong, Eugene, et al; "A Method for Projecting Useful Life of LED Lighting Systems"; Prceedings of SPIE—3$^{rd}$ Intl Conf on Solid State Lighting—San Diego, CA, US; pp. 93-99 (Feb. 10, 2004).

Electronic Industries Association-Engineering Dept; "EIA/JES051-1 Integrated Circuits Thermal Measurement Method—Electrical Test Method (Single Semiconductor Device)"; Electronic Industries Alliance, Arlington, VA, US; pp. 1-33 (Dec. 1, 1995).

Hulett, Jeff, et al; "Measureing LED Junction Temperature"; Photonics Spectra; (Jul. 2008).

International Search Report and Written Opinion for Application PCT/IB2009/050325 (Jan. 27, 2009).

* cited by examiner

SYSTEM AND METHOD FOR ESTIMATING THE JUNCTION TEMPERATURE OF A LIGHT EMITTING DIODE

This invention relates to lighting devices using light emitting diodes (LEDs), and particularly to the control of such devices based on temperature.

Lighting using solid-state devices such as LEDs is gaining momentum. The use of LEDs for lighting has several advantages over the use of conventional light sources, including a better light output/dimension ratio and improved power efficiency. The light output intensity of a LED can be controlled by either:

(a) regulating the amplitude of the current through the LED, or (b) regulating the frequency and duty cycle of the current pulse through the LED.

A combination of both techniques can also be used.

During operation, the LED temperature increases and this influences the amount of light output of the LED as well as the dominant wavelength of the output light. A knowledge of the temperature at the junction of a LED is crucial for controlling the LED to have maximum performance.

It has been recognised that temperature measurement is desirable to provide a feedback value for use in controlling the LED driver conditions. Typically, the LED junction temperature is measured using an external temperature sensor located close to the LED. This method has one major disadvantage that the measured temperature is not the real temperature at the LED junction (which is usually higher). To compensate for this error, sophisticated thermal diffusion models can be used to predict (or extrapolate) the LED junction temperature based on the measured temperature from the sensor. The accuracy of the junction temperature prediction is heavily dependent on the quality of the model, and the accuracy of the parameters that are used in the model, such as thermal resistance and thermal capacitance of the packaging materials surrounding the LED etc.

Another known method to measure LED junction temperature is to monitor the forward voltage of the LED while driving a constant current through it. This method uses the LED itself as a temperature sensor, and therefore saves cost and also should enable improved accuracy. However, the current through the LED can introduce a so-called self-heating effect which in turn makes the temperature reading less accurate. A solution to avoid the self-heating effect of the LED is to use a very small current for LED junction temperature measurement.

However, using a small current to measure the forward-voltage of the LED means it can only be done when the LED is turned off. The time delay between the moment the LED is turned off to the moment measurement takes place will influence the accuracy of the temperature reading, due to the extremely fast junction cool-off phenomenon. Another problem with the accuracy of temperature measurement using this method is the variation of the small current used for measurement can induce a variation in the forward voltage of the LED. Depending on the amplitude of the measurement current and its variation, the change in forward voltage due to temperature may not be visible.

US 2005/0082553 describes a method for controlling a LED by detecting the forward voltage of the LED while it is illuminating at operational current and to map this to the ambient temperature of the LED. The value of temperature is then translated to an appropriate current needed to drive the LED by means of a table look up method. The current flow through the LED is subsequently adjusted accordingly with the new value.

In this control method, the table look up approach does not give good control over LED performance, because the values are discrete and therefore the performance of the LED will be erratic. To avoid erratic LED performance, many points are be required in the table requiring significant memory size and slow speed of the control.

According to the invention, there is provided a method of estimating the junction temperature of a light emitting diode, comprising:

driving a forward bias current through the diode, the current comprising a square wave which toggles between high and low current values, the high current value comprising an LED operation current, and the low current comprising a non-zero measurement current;

sampling the forward bias voltage drop, and determining the forward bias voltage drop at the measurement current; and deriving the temperature from the determined forward bias voltage drop.

This method uses measurement current pulses for driving the LED with a low non-zero current. This allows the LED temperature measurement to take place while the LED is in operation. The low measurement current pulses are alternated (in a square wave pulse sequence) with high current LED drive pulses.

The low measurement current pulses may have a current less than or equal to 1 mA.

Preferably, determining the forward bias voltage drop comprises analysing the samples to find a forward bias voltage drop which corresponds to a peak in the number of occurrences of that voltage drop.

In this way, the samples are analysed to detect a local peak in the number of occurrences of measured voltage drops. The detected peak corresponds to the voltage drop associated with the fixed low measurement current. There may be other peaks corresponding to the drive current, but the voltage drop corresponding to the low current will be the peak at the lowest voltage. Analysing the samples can comprise deriving a histogram.

The use of multiple pulses and a histogram helps to average out the variations in measurement current and therefore improve the accuracy of the measurement. In this method, no extra temperature sensor is required and therefore it lowers the cost of the system as a whole.

The derived temperature can be used as a feedback control parameter for controlling the current supply to the diode.

The can be used for estimating the junction temperature of a plurality of light emitting diodes of a module, and each light emitting diode of the module can be driven to the low current value simultaneously. This avoids interference from one diode at the high current providing cross talk to the low current measurement. This common low current phase can be achieved by providing one or more duty cycle control periods with only the low current value.

The invention also provides a system for estimating the junction temperature of a light emitting diode, comprising:

means for driving a forward bias current through the diode, the current comprising a square wave which toggles between high and low current values, the high current value comprising an LED operation current, and the low current comprising a non-zero measurement current;

means for sampling the forward bias voltage drop, and determining the forward bias voltage drop at the measurement current; and means for deriving the temperature from the determined forward bias voltage drop.

The invention also provides a LED control system a system for estimating the junction temperature of the invention and an LED drive circuit for driving the LED in dependence on the estimated junction temperature.

Examples of the invention will now be described with reference to the accompanying drawings, in which.

The invention provides a method (and apparatus) to measure the junction temperature of a LED with good accuracy by using square wave current pulses, in which the high level ($I_{high}$) is an operational current of the LED and the low level is a measurement current. By monitoring the forward voltage (Vf) of the LED over time, two dominant values will be found (if the operational current is constant over the monitoring period), one of which is representative of the real temperature at the LED junction during operation. A histogram of the forward voltage drops can be used for the data analysis.

FIGS. 1A to 1D are graphs will schematically represent the method of the invention.

Figure 1:
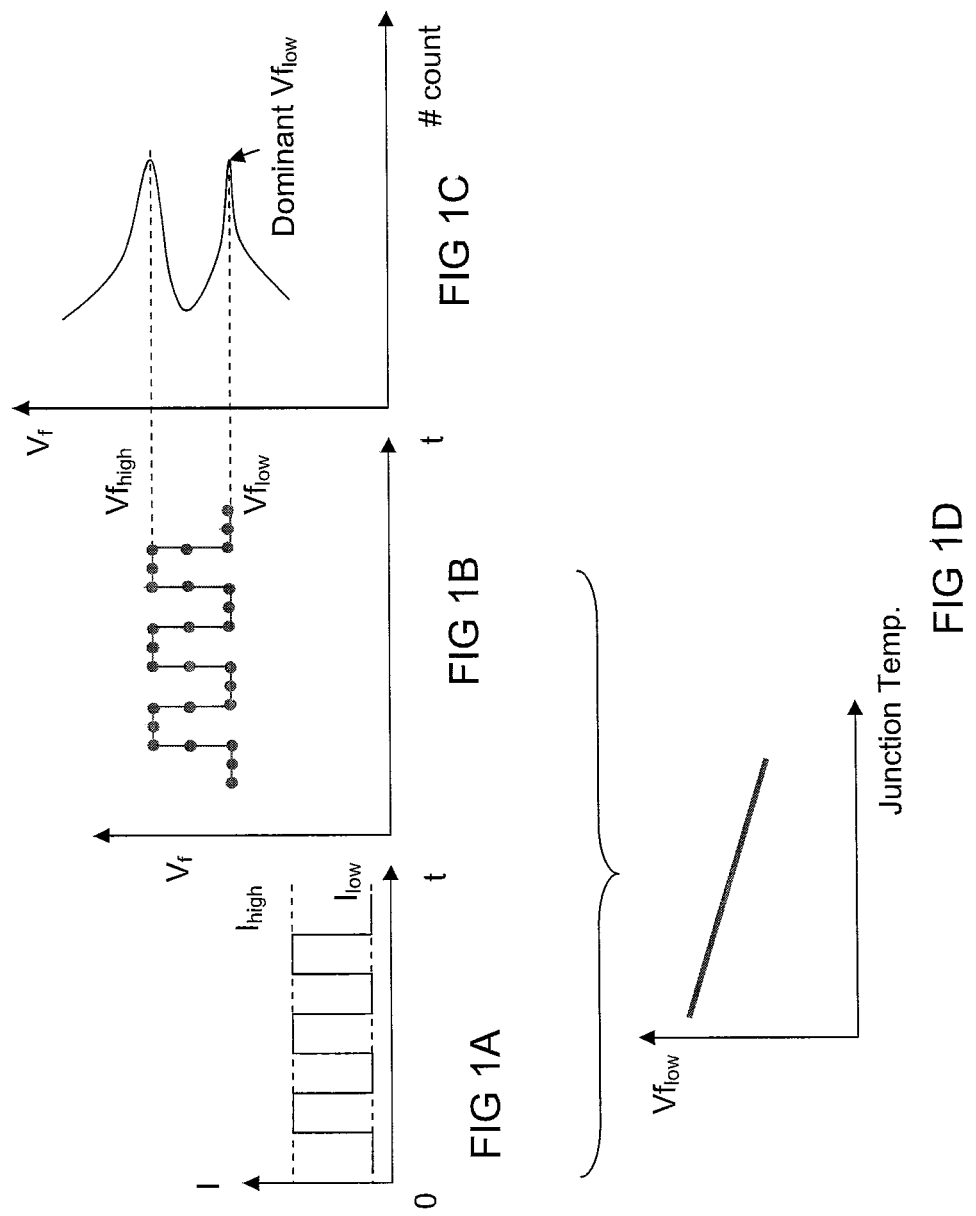
FIGS. 1A to 1D are graphs to explain the method of the invention.

FIG. 1A shows the drive current applied to the LED. A pulsed current source is used to drive the LED. The pulses drive a forward bias current through the diode, and the current is in the form of a square wave which toggles between high and low current values.

The low current value is a measuring current, preferably smaller or equal to 1 mA. More preferably this current is less then 500 pA, more preferably less then 100 pA, even more preferably less then 50 pA and even more preferably less then 10 pA, for example in the region of 5 µA.

A low measurement current (for example less than 1 mA) is desired for two main reasons. Firstly, if a LED is driven at large current, the self-heating effect starts, which means a less accurate measurement is obtained. The self-heating effect has been found by the applicant to be significant above currents of 1 mA. The self-heating effect depends on the thermal design of the LED package, and is therefore different for different LED designs.

Secondly, the larger the current, the brighter the LED. In an application such as 2D dimming TV, the minimum light level emitted from the backlight should not be more than 1% of the maximum illumination level. This 2D dimming system is a backlight control method in which only parts of the backlight are illuminated so that improved contrast between bright and dark areas of an image can be obtained.

The desire for low light output for the measurement phase means that the lowest possible current is required, but the current needs to be sufficient for the LED to be forward biased so that the voltage can be measured.

These considerations will all be taken into account when selecting the measurement current, and the value will depend on the intended use of the LED, the thermal properties of the packaging, and the LED characteristics.

FIG. 1B shows the resulting forward bias voltage drop Vf across the diode.

The forward bias voltage drop is sampled at regular intervals, and the sampling instants are shown as filled circles in the plot of FIG. 1B.

At each sampling instant, the voltage is measured, and a histogram counter monitors this LED voltage Vf, and determines the dominant value of voltage drop.

This is achieved by creating the histogram as shown in FIG. 1C. As shown, there are two peaks in the count number. The peak in the count number corresponding to the higher voltage drop derives from the drive current (as this has been shown as constant in FIG. 1A). The peak in the count number corresponding to the lower voltage drop derives from the measurement current, and this peak represents the forward bias voltage drop at the low current measurement value.

The LED junction temperature can be determined by relating the dominant forward bias voltage drop corresponding to the measurement current with a calibrated curve or an analytical model of the relationship between forward bias voltage Vf and temperature T. This relationship is shown schematically in FIG. 1D.

The LED performance is determined by the temperature at its junction.

An analytical function is used to define the relationship shown in FIG. 1D, giving very low memory requirement. This analytical function enables a very smooth control of the LED light and colour output as well as an analogue (rather than discretised) solution to the required drive current.

The output flux of the LED is controlled by the high current value of the current drive sequence, as well as the pulse frequency and the duty cycle. However, the measurement current value is unchanged throughout the operation.

At the operational current, the LED junction is heated up leading to the so-called self heating effect. Measurement using this current is therefore much less accurate (the measured temperature is always more or less than the actual temperature in this dynamic situation). An error in the temperature determination will of course have a large impact on the accuracy of the control scheme. At the operation current, especially for high power LEDs (~100 mA drive current) the contact and wiring resistance to the LED plays an important role. The variation of contact and wiring resistance can cause the forward bias voltage drop to vary typically by a few tens of mV at the operational current, which in turn gives errors to the junction temperature determination. Typically, the slope of the Vf vs. T curve is only few mV per degree Celsius.

For different currents, the slope of the Vf vs. T curve will be different. Thus, if the LED temperature is to be determined by the forward bias voltage drop at operational currents, the control will be difficult because when different output flux of the LED is required, the drive current has to be changed.

It is computationally not practical to provide an analytical model of the forward bias voltage drop both as a function of temperature and drive current.

The approach of the invention provides a constant measurement current so that a model of the relationship between the corresponding forward bias voltage drop and temperature can be easily derived and stored, avoiding the need for look up tables, which introduce unwanted discretisation.

Another advantage of measuring the voltage drop (and therefore temperature) at low current (for example less than 1 mA) is that in some applications, such as backlighting for an LCD panel, it enables a dimming operation to be implemented, where a fast dynamic response to a requirement for a light output change, and high contrast between light and dark, is required. The light output can be altered by changing the duty cycle of the current waveform, and the low measurement current results in very little light emission, so that good dark performance can be obtained.

The invention can be used to determine LED junction temperature for LED performance control.

Figure 2:
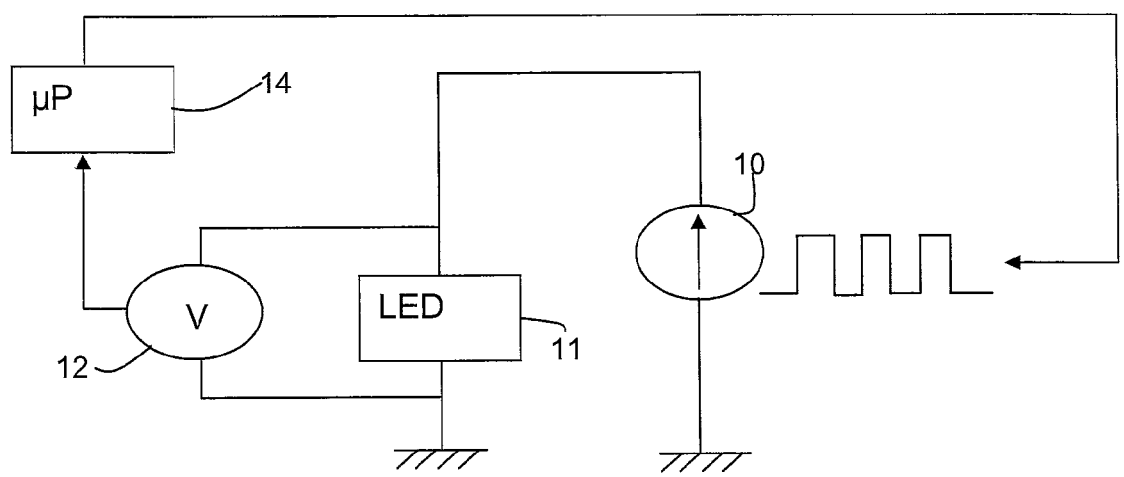
FIG. 2 shows the system of the invention.

FIG. 2 shows a system for estimating the junction temperature of a light emitting diode.

A current source circuit 10 is used for driving a forward bias current through the diode 11, and this current comprises the square wave described above. Any suitable current source circuit can be used for this purpose.

The forward bias voltage drop is sampled by a voltage measurement circuit 12, and the samples are provided to a processor 14. The processor 14 stores the analytical function representing the voltage-temperature characteristics, and determines the forward bias voltage drop at the measurement current based on the histogram analysis described above. The processor derives the temperature from the determined forward bias voltage drop using the function.

The temperature is then used for controlling the diode 11 so that the light output is accurately controlled to a desired level with the effects of temperature being compensated.

The driver for a LED can have more than one current source, and it is possible that a driver has two current sources (or many more) for two current values. A switch can then be provided to generate the LED pulsed current.

As mentioned above, the luminous flux of a LED can essentially be controlled in two ways (or a combination of these):

(i) the amplitude of a constant current,
(ii) a pulsed current (between a constant operation current and zero) and variable duty cycle.

In general, a LED is driven by the second method for a number of reasons. This drive method gives no chance for thermal runaway issues. As a result of a constant operational current, the dependency of the LED peak wavelength on the current is eliminated, and thus controlling the LED colour point is easier.

FIG. 2 shows the current source 10 under the control of the processor 14, so that a control loop is implemented.

For a given colour point and desired luminous flux, the task of the control loop model is to calculate the appropriate currents for red, green and blue LEDs based on the junction temperature information from the LEDs.

The control loop is based on a number of modelling steps:

The first element is the LED characterization, used to measure the LED performance as functions of temperature and drive current.

From the measured data, experimental compact models for the LEDs are built and contain the key functions of output flux $\phi$, wavelength $\lambda$ and the standard deviation $\sigma_\lambda$ of the light output intensity with respect to wavelength, centred on the wavelength which is at the peak output intensity: These three functions are all dependent on the temperature and drive current (f(Tj, I)).

The models of the red green and blue LEDs are then incorporated into a program to calculate the colour point coordinate u'v', and into a program to calculate total luminous flux output of the LED cluster at a given temperature and drive currents.

For a certain required colour point and luminous flux, and at a specific junction temperature, a set of currents for the red, green and blue LEDs can then be calculated. This calculation is then repeated for other temperatures within the possible operating temperature range of the LED cluster.

This modelling enables a table containing junction temperature values and corresponding currents for red, green and blue LEDs to be built. Finally, the table is reduced into three analytical functions which describe the relation between the drive current of a LED and junction temperature, so that the combination of three red, green and blue LEDs produces the exact colour point and luminous flux requested.

For practical reasons, the analytical functions can be parabolic functions. Thus for each LED cluster, there are only 3 parameters needed for the control model at a given colour point and luminous flux. By using analytical functions instead of a table look-up method, the control quality is greatly improved and much less memory space is required to store the control model in a LED driver chip.

For lighting purposes, the current frequency has to be high enough so that human eye can not see the flickering. This minimum frequency is around 24 Hz, but in practice the pulsing frequency will typically be between 300 Hz and 1.5 kHz, but it can be even higher. For TV backlight applications, the most common frame rate now is 120 Hz. and this sets the minimum frequency for the LED pulsing.

For the analysis of multiple LED within a device, as method is also provided which reduces signal interference to the measurement signals. When measuring a LED at low currents, interference from the other LEDs in a module can occur when they are at a high current. This interference can be the result of leakage currents from the high-current LEDs, and these can affect the measurements taken.

Figure 3:
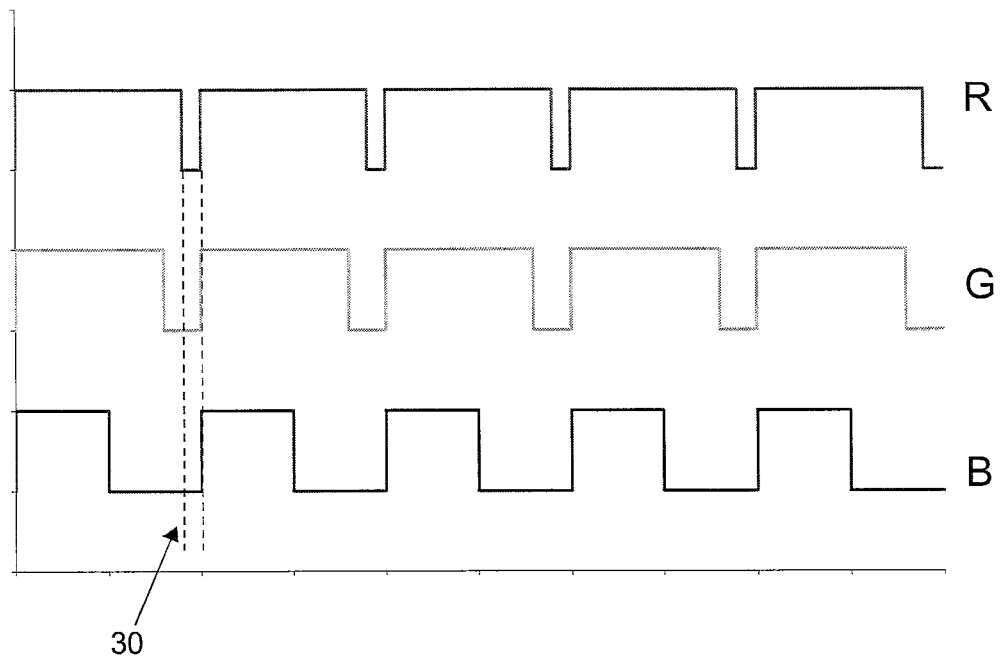
FIG. 3 shows a first possible timing diagram for the control of multiple LED devices.
Figure 4:
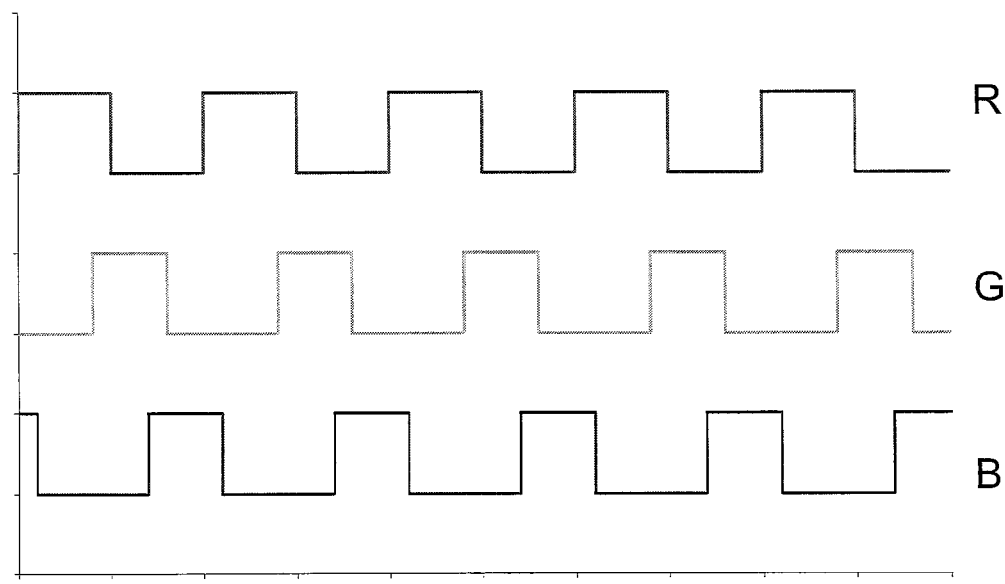
FIG. 4 shows a second possible timing diagram for the control of multiple LED devices.

This issue of interference can arise in a number of different drive schemes. FIG. 3 shows the control of red ("R"), green ("G") and blue ("B") LEDs which are operated with a high duty cycle. This results in a very small time window 30 when all LEDs in the module are at low current. FIG. 4 shows the control of red ("R"), green ("G") and blue ("B") LEDs with the control the pulses shifted with respect to each other so that there is no measurement window when all LEDs are at low current.

A solution to this problem is to periodically switch all three LEDs of a colour LED module to the low current phase, and use this time window to measure the forward voltage.

This approach is shown in FIG. 5, which again shows the control of red ("R"), green ("G") and blue ("B") LEDs in the same way as in FIG. 3. A relatively large time window 50 is provided for the required measurements. IN particular, the time window 50 is now longer than period of the oscillating PWM current signal. This means the measurement of the forward voltage LEDs is not disturbed by the operating current of the other LEDs within the module.

In the example shown, periodically, all the LEDs in the module miss one of their high current pulses, and stay on the low current value.

The duration of the window 50 will be selected to provide a large enough time window to measure accurately the forward voltage of the LEDs. The window may require one of the periodic drive pulses to be missed as shown, or it may require multiple drive pulses to be missed, depending on the drive frequency, and therefore the period of the drive pulses. The time period 50 is also chosen, however, so that the disruption to the normal control of the LEDs has no, or very limited, impact on the output as perceived by the user of the device.

This modification can be implemented simply by arranging the driver of the LED modules to be able to periodically skip one or more high pulses, to be able to measure the forward voltage that relates to the junction temperature in the manner described above.

Figure 5:
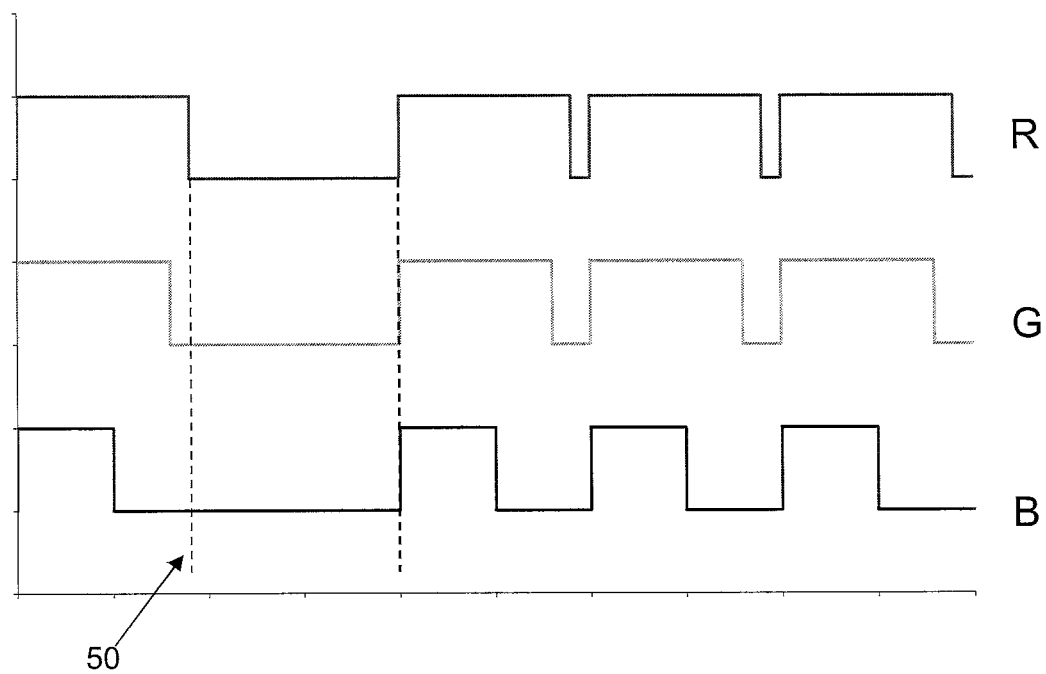
FIG. 5 shows an example possible timing diagram for the control of multiple LED devices with temperature measurement of the invention.

As shown in FIG. 5, the simultaneous low current values can be periodically provided—with a much slower period than the duty cycle control period—as the temperature/ageing compensation can be much less frequent than the frequency of the duty cycle control. For example, the temperature measurement can be repeated at intervals of seconds or minutes. Thus, the common low current periods are for a measurement phase of operation of the LED module.

The invention has been tested, and has been found to enable colour variations as a result of ambient temperature change to be controlled so that they do not exceed the detection limit of the human eye, over the entire operating temperature range of an LED cluster. This level of control accuracy can be achieved without using any external sensor, as the LED junction temperature measurement is implemented via the power lines. The testing can be carried out a speed of up to 1 kHz. This is very important when accurate colour control of LEDs is required while there is a frequent change of the LED output flux (for example a video display). The speed of response enabled by the invention is not be possible by using a temperature sensor located close to the LED, due to the slow temperature diffusion through multiple heat resistances (packaging materials). Furthermore, this testing speed demonstrates that the time window 50 explained with reference to FIG. 5 does not need to visibly impact the output to the viewer, as a duration of 1 ms can be sufficient for the measurements to be taken. As mentioned above, a typical LED drive frequency is 300 Hz to 1.5 KHz. Thus, for a drive frequency in the range 300 Hz to 1 KHz, only one duty cycle period needs to be suppressed for the measurement phase to be implemented. If a higher drive frequency is used, two or more successive duty cycle periods may be suppressed.

An LED module can have any number of LEDs, not only three as in the example above.

Various modifications will be apparent to those skilled in the art.

The invention claimed is:

1. A method of estimating the junction temperature of a light emitting diode, comprising:
   driving a forward bias current through the diode, the current comprising a square wave which toggles between high and low current values ($I_{high}$, $I_{low}$), the high current value ($I_{high}$) comprising an LED operation current, and the low current value ($I_{low}$) comprising a non-zero measurement current;
   sampling a forward bias voltage drop (Vf), and determining the forward bias voltage drop ($Vf_{low}$) at the measurement current ($I_{low}$);
   deriving the temperature from the determined forward bias voltage drop; and
   wherein determining the forward bias voltage drop (Vf) comprises analysing the samples to find a forward bias voltage drop which corresponds to a peak in the number of occurrences of that voltage drop.

2. A method as claimed in claim 1, wherein the measurement current ($I_{low}$) is less than or equal to 1 mA.

3. A method as claimed in claim 1, wherein analysing the samples comprises deriving a histogram.

4. A method as claimed in claim 1, further comprising using the derived temperature as a feedback control parameter for controlling the current supply to the diode.

5. A method as claimed in claim 1, wherein deriving the temperature from the determined forward bias voltage drop comprises converting the forward bias voltage drop to a temperature value using a transformation function that represents the voltage-temperature characteristics at the measurement current.

6. A method as claimed in claim 1, wherein the junction temperature estimation takes place while the LED is providing a desired light output, determined by the duty cycle and high current value of the forward bias current.

7. A method of estimating the junction temperature of a plurality of light emitting diodes of a module, comprising using the method as claimed in claim 1 for each light emitting diode of the module,
   wherein the method further comprises driving each light emitting diode of the module to the low current value simultaneously for a measurement cycle.

8. A method as claimed in claim 7, wherein the junction temperature estimation takes place while the LED is providing a desired light output, determined by the duty cycle and high current value of the forward bias current, and wherein each light emitting diode of the module is driven to the low current value simultaneously by providing at least one duty cycle control period with only the low current value.

9. A system for estimating the junction temperature of a light emitting diode, comprising:
   means for driving a forward bias current through the diode, the current comprising a square wave which toggles between high and low current values, the high current value ($I_{high}$) comprising an LED operation current, and the low current ($I_{low}$) comprising a non-zero measurement current;
   means for sampling a forward bias voltage drop (Vf), and determining a forward bias voltage drop ($Vf_{low}$) at the measurement current ($I_{low}$);
   means for deriving the temperature from the determined forward bias voltage drop; and
   wherein the means for sampling comprises means for analysing the samples to find a forward bias voltage drop which corresponds to a peak in the number of occurrences of that voltage drop.

10. A system as claimed in claim 9, wherein the measurement current ($I_{low}$) is less than or equal to 1 mA.

11. A system as claimed in claim 9, wherein the means for deriving the temperature from the determined forward bias voltage drop comprises a memory storing a transformation function that represents the voltage-temperature characteristics at the measurement current.

12. A system for estimating the junction temperature of a plurality of light emitting diodes of a module, comprising a system as claimed in claim 9, wherein the means for driving is adapted to drive each light emitting diode of the module to the low current value simultaneously for a measurement cycle.

13. A system as claimed in claim 12, adapted to implement the junction temperature estimation while the LED is providing a desired light output, determined by the duty cycle and high current value of the forward bias current, and wherein the means for driving is adapted to drive each light emitting diode of the module to the low current value simultaneously by providing at least one duty cycle control period with only the low current value.

14. A LED control system comprising:
   a system for estimating the junction temperature as claimed in claim 9, and an LED drive circuit for driving the LED in dependence on the estimated junction temperature.

* * * * *